United States Patent [19]

Wessel

[11] Patent Number: 4,491,552
[45] Date of Patent: Jan. 1, 1985

[54] PRESSURIZED/HEATED VARIABLE JET CARBURETOR

[76] Inventor: Tim Wessel, R.R. 2 Box 17, Truman, Minn. 56088

[21] Appl. No.: 510,775

[22] Filed: Jul. 5, 1983

[51] Int. Cl.³ .............................................. F02M 15/02
[52] U.S. Cl. .................................... 261/144; 123/545; 123/552; 261/120; 261/44 C; 261/64 B; 261/145; 261/DIG. 83
[58] Field of Search ............. 261/DIG. 83, 120, 44 C, 261/64 B, 144, 145; 123/545, 552

[56] References Cited

U.S. PATENT DOCUMENTS

| | | | |
|---|---|---|---|
| 951,590 | 3/1910 | Brown | 261/DIG. 83 |
| 991,932 | 5/1911 | Bashore et al. | 261/120 |
| 1,530,882 | 3/1925 | Chapin | 261/DIG. 83 |
| 1,847,063 | 2/1932 | Cross | 261/DIG. 83 |
| 2,109,743 | 3/1938 | Faverty et al. | 261/DIG. 83 |
| 2,229,452 | 1/1941 | Hammer et al. | 261/DIG. 83 |
| 2,678,202 | 5/1954 | Brake | 261/DIG. 83 |
| 2,742,886 | 4/1956 | McPherson | 261/DIG. 83 |
| 2,795,493 | 6/1957 | Gochoel | 261/DIG. 83 |
| 3,444,848 | 5/1969 | Lawrence | 123/545 |
| 3,713,429 | 1/1973 | Dwyre | 123/552 |

FOREIGN PATENT DOCUMENTS 1223371  2/1971  United Kingdom ................ 261/144

Primary Examiner—Tim Miles
Attorney, Agent, or Firm—Orrin M. Haugen; Thomas J. Nikolai; Douglas L. Tschida

[57] ABSTRACT

A monolithic variable jet carburetor comprising an air intake, an associated variable jet and an underlying fuel reservoir, all contained within a pressurized and heated chamber and whereby the fuel is injected into the reservoir under pressure and is atomized via an overlying wire mesh screen and vaporized as it traverses the remainder of the heated delivery path to the air intake. The heated chamber is adapted to heat the fuel at all points intermediate the float chamber and air intake venturi via hot engine gasses or heated engine coolant and wherein the float chamber is further pressurized via an air pump. Pressure/temperature sensors control the relative ratios thereof during normal engine cycling under various load conditions.

7 Claims, 3 Drawing Figures

PRESSURIZED/HEATED VARIABLE JET CARBURETOR

BACKGROUND OF THE INVENTION

The present invention relates to fuel delivery systems and, in particular, to a variable jet carburetor wherein the fuel delivery path is surrounded by a heated chamber and wherein the fuel is atomized/vaporized via the heat and a positive pressure air source and wire mesh containing float assembly.

In recent years as gasoline costs have risen, numerous efforts have been undertaken in search of more efficient fuel delivery systems, whereby gasoline or the like may be controllably atomized and/or vaporized prior to being introduced to the combustion chambers. In this regard, various efforts have been expended with respect to numerous different types of carburetors employing the singular concepts of heating the gas or air/gas mixture prior to introduction into the combustion chamber and/or atomizing the gas via bubbling techniques or the use of finely perforated tubes or wire mesh screen. Examples of such structures can be found upon reference to U.S. Pat. Nos. 376,638; 583,818; 951,590; 1,901,841; 2,826,183; 3,610,213; 3,826,234; 3,931,801; 4,004,741; 4,302,407; 4,335,698; and 4,345,568.

Upon reference to such patents, though, it is to be noted that most efforts have heretofore been directed to fixed jet carburetors where for some designs the gas is atomized with the aid of positive pressure exhaust gases. While for others the gas is atomized by subjecting the liquid fuel to a series of finely meshed screens and for still other designs various portions of the flow path and fuel are heated prior to the fuel entering the combustion chamber.

The present invention while similar in some respects, differs in that it contemplates a new unique variable jet carburetor configuration. Specifically, the present invention contemplates a carubrettor such as of the type manufactured by S. U. Carburettor Corporation, but wherein the air intake or venturi, variable jet, fuel reservoir and associated float are superposed over one another and are all contained within a heated chamber. Exhaust gas or heated coolant water is channeled to heat the entire fuel delivery path to better vaporize the air/fuel mixture. Vaporization is further enhanced via an intermediate float assembly containing a fine wire mesh and through the spaces of which the liquid fuel is forced upon being subjected to a positive pressure air source (which may or may not be heated). Associated pressure and temperature sensors, in turn, monitor operating pressures and temperatures so as to vary the relative proportions of each control medium as the engine warms and depending upon load conditions.

Before describing the various details of the present invention, however, it is to be recognized that the present invention is described hereinafter in an illustrative manner only with respect to its presently preferred embodiments. Accordingly, numerous other modifications and configurations might suggest themselves to those of skill in the art and, therefore, it is contemplated that the present invention shall be interpreted to include all those equivalent embodiments as hereinafter described and/or claimed.

SUMMARY OF THE INVENTION

An improved multi-chambered variable jet carburetor wherein the air intake or venturi, variable jet assembly and fuel reservoir are contained within a heated chamber and through which a heated gaseous or liquid medium passes. The air intake, variable jet and fuel chamber are superposed over one another such that the liquid fuel is essentially vaporized before being admitted to the combustion chamber. Specifically, a positive pressure air supply in combination with a wire mesh containing float assembly facilitate the atomization of the fuel, while vaporization is achieved via the heating of the atomized gas and pressurized air prior and subsequent to mixing the fuel with intake air.

The float assembly is particularly comprised of a donut-shaped float having the inside annular opening thereof covered with a fine wire mesh such that the pressurized fuel is atomized upon being forced therethrough via the introduction of a bottom-fed, positive air pressure. The pressurized air is obtained from an air pump and tank and may be heated or not.

DESCRIPTION OF THE PREFERRED EMBODIMENT

Figure 1:
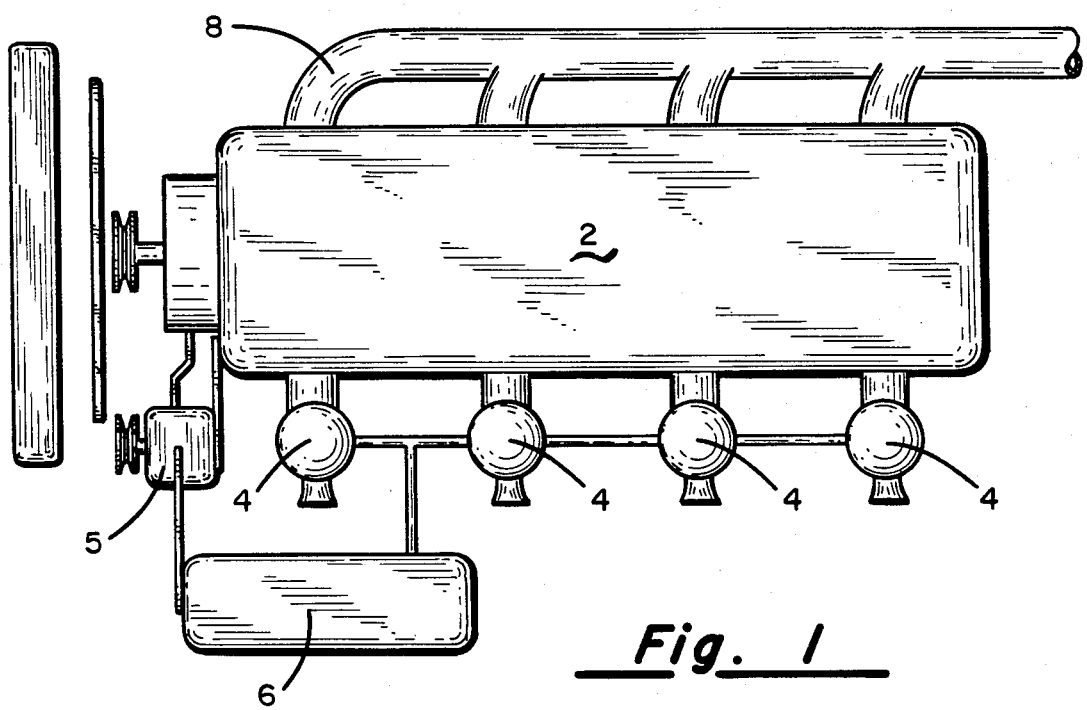
FIG. 1 shows a generalized top view of an in-line four or six cylinder engine, the cylinders of which are supplied with vaporized gas mixtures via the presently improved variable jet carburetors.

Referring to FIG. 1, a generalized top view is shown of a typical four or six cylinder in-line engine 2 adapted to the present variable jet carburetor 4. Specifically, the engine 2 has been modified so as to incorporate individual side mounted variable jet carburetors 4 therein and which supply appropriate fuel/air mixtures to one or more of the engine's cylinders. An air pump 5 and pressure tank 6 are mounted anterior and to the side of the engine block so as to permit the pump 5 to be driven via a belt/pulley assembly and provide a positive pressure air supply in a bottom-fed configuration to each of the carburetor 4's fuel reservoirs. Exhaust gases are, in turn, exhausted via the exhaust manifold 8. At the same time, heated liquid engine coolant is caused to circulate within the chambers surrounding each of the carburetors 4 or alternatively, the exhaust gases are employed to preheat the fuel prior to its admission to the air intake and combustion chambers of each cylinder. It should be recognized, too, that in lieu of cool fresh air, the air tank 6 may also be coupled to the exhaust gases so as to preheat the pressurized air prior to its admission under a controlled postive pressure to the bottom of the fuel reservoirs. Also, while a belt driven air pump 5 is presently contemplated, alternatively electric or hydraulic air pumps, among others, could be used if they supplied a sufficient output.

While FIG. 1 depicts an in-line engine block assembly, it is to be recognized that the present invention may alternatively be incorporated into any other configuration, for example a V configuration using one or more carburetors 4, by suitably adapting the engine block or carburetor mounting to one another via well-known engineering techniques and with or without interconnecting intake manifolds. Although, if only one carburetor is used on an engine of more than one cylinder, it is recommended that a turbo-charger or super-charger (and which are commonly available) be added downstream from the carburetor to maintain the thorough mixing and vaporization of the air/fuel mixture. Also, it is to be recognized that the present air pump 5 may be of any of the types presently being manufactured and which are oftentimes encountered in air braking systems or the like so long as it produces adequate pressures and is adaptable to a belt driven mounting.

Figure 2:
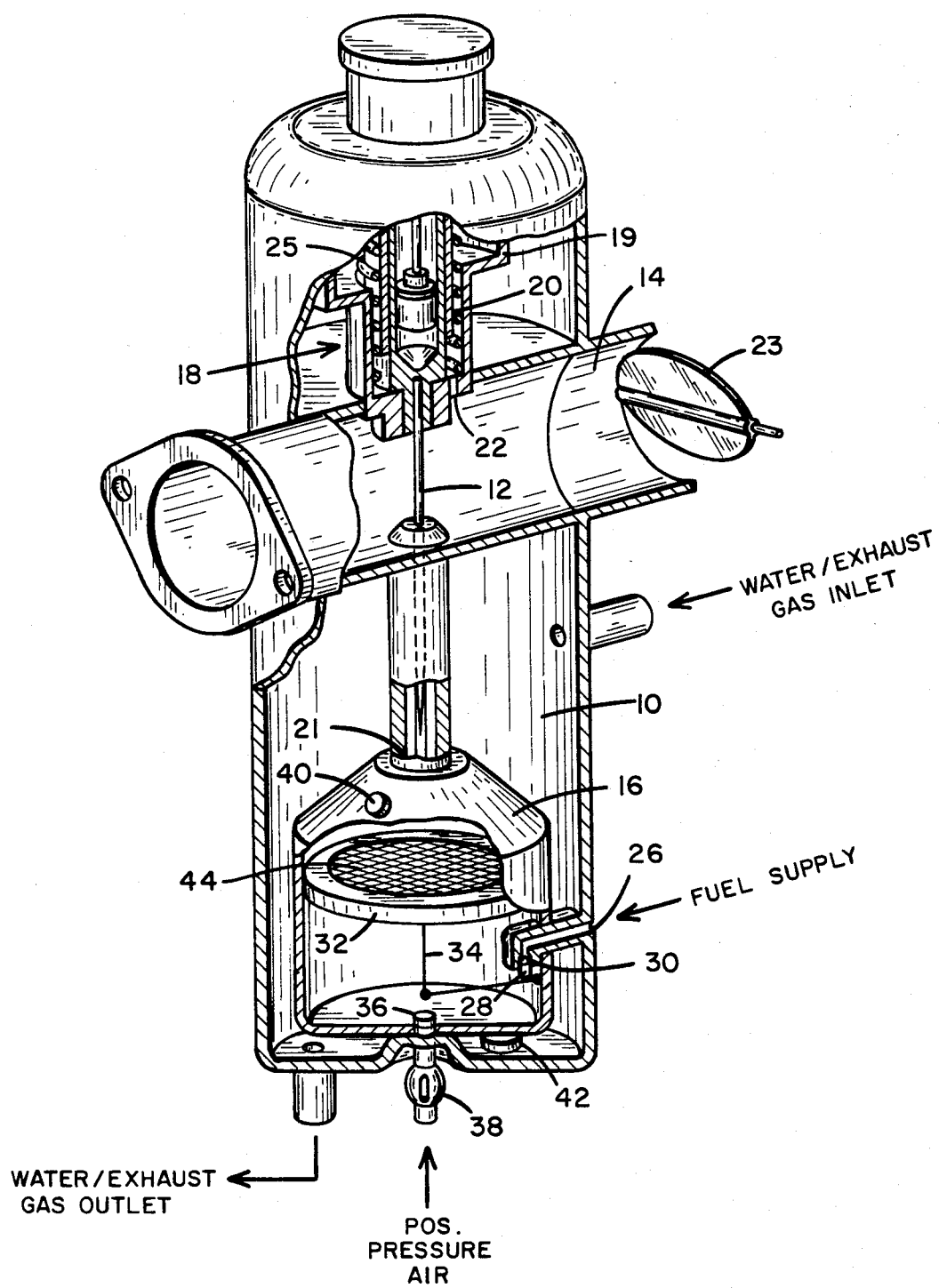
FIG. 2 shows a detailed cross sectional view of a presently preferred variable jet carburetor.

Referring next to FIG. 2, a detailed cross-sectional view is shown of the present carburetor 4 relative to its presently preferred construction and which generally comprises the following major portions: a surrounding water jacket 10 for passing heated water or exhaust gases about the fuel path, thereby facilitating the vaporization of the fuel prior to its admission to the combination chambers; a variable jet 12 for controllably varying the exposed area of the fuel supply orifice; an air intake 14; and a fuel reservoir 16. While various forms of such carburetors 4 have previously existed and which can be seen upon reference to various related product literature of the S. U. Carburettor Corporation, these carburetors were not fabricated in the present superposed fashion. Rather, the fuel reservoirs were side mounted, adjacent to the air intake 14, and thus were not as amenable to water heating in the present fashion. Also, the carburetors were not heated via a surrounding chamber 10 nor used a float assembly of the present type.

The present combination, therefore, contemplates the superpositioning of the fuel chamber 16 relative to the variable jet 12 such that as the variable jet (i.e. tapered needle) 12 rises and falls with engine demand, the exposed orifice area is directly varied so as to admit more or less of the underlying atomized fuel. Thus, the fuel enters the fuel delivery path in a straight line, without having to pass through extraneous flow paths, at a relatively high pressure due to the positive pressure of the air pump 5 and tank 6 so as to facilitate vaporization of the fuel and which is also increased due to the surrounding water/air heating.

Before referring to the structure of the present variable jet 12 and controlling piston assembly 18, it is to be noted that it is contemplated that the present carburetor 4 would typically be manufactured from a suitably molded white metal casting in one or more mating portions so as to facilitate the assembly of the various piece- parts therein, while ensuring the integrity of the surrounding fluid chamber 10. Any such configuration would, therefore, take into account normal design practices along with the desirability of a relatively easily manufactured and maintained carburetor. Thus, while the present FIG. 2 generally discloses a two part assembly, various other water tight assemblies may also be as advantageously employed. The primary goal of any such design, though, is to isolate the heating medium from the air/fuel path.

Referring now to the particulars of the piston assembly 18 for controlling the variable jet 12, it is to be noted that it is generally mounted within a cylindrical bore in a top-mounted housing 19 overlying the air intake 14 (and which in the preferred embodiment is separate and isolated from the chamber 10) and is coupled to the tapered needle jet 12 that is centrally mounted relative to an orifice containing seat 21 at the top of the underlying fuel reservoir 16. In particular, the tapered needle 12 is coupled to a spring loaded piston 20, which moves up and down within the chamber 19, depending upon the suction exerted by the air passing the aperture 22 in the air intake 14. Depending upon the amount of air passing across the aperture 22, and which will depend upon engine loads and the amount that the butterfly or throttle valve 23 is opened, the suction will vary as well as the corresponding height to which the piston 20 is raised. However, because the tapered needle 12 mounts within the tapered seat 21, as the needle 12 rises, the area of the opening exposed to the underlying atomized gas is increased so as to increase the fuel flow to the air intake 14, with the increased load demand. Thus, depending upon the throttle control, the suction placed on the piston 20 will vary and correspondingly the amount of fuel supplied to the combustion chamber.

As mentioned, associated with the piston 20 is a spring 25 that controls the rate of rise and fall of the piston 20 relative to increased demands so as to ensure that not too rich a mixture is supplied with changing load demands, but rather that an averaged mixture (due to the time delay that is caused by the spring 25) is supplied. Generally, though, the various mechanics and details of variable jet carburetors are well known and, accordingly, further details of the operation and structure thereof will not be discussed. Should the reader require further information, though, he/she is directed among other places to various product literature of the S. U. Carburettor Corporation.

Referring next to the fuel reservoir 16, it is to be noted that it is generally configured so as to admit fuel from a side inlet 26 via a needle valve 28 and seat 30 that are, in turn, pivotally coupled to a donut-shaped float 32. As the fuel level falls with increasing engine demands, the donut-shaped float 32 falls as well as its associated linkage 34 and which, in turn, pivots and causes the needle valve 28 to fall. As the needle valve 28 falls, fuel is pumped into the reservoir 16 via a fuel pump (not shown) so as to refill the chamber 16 and the uppermost level of which fuel is determined as the donut float 32 rises to the point whereat the needle valve 28 again is seated. It should be noted that as the float 32 rises and falls, it is constrained against rotating via associated key ways (not shown) or the like that are formed within the chamber 16 so as to ensure that the linkage 34 maintains contact at all times with the needle valve 28. Further, the maximum lower level of the float 32 is controlled via stops mounted within the key ways or on the periphery of the internal chamber 16.

Located at the bottom-center of the fuel reservoir 16 is a positive pressure air inlet 36 that is coupled to an air control valve 38 and the positive pressure air pump and tank 5 and 6. Depending upon load conditions, an associated air pressure sensor 40 mounted at the top of the fuel reservoir 16 detects the pressure within the reservoir 16, and which pressure rises and falls with increasing or decreasing engine demands. Thus, as the throttle 23 opens and the needle 12 rises, the pressure falls within the chamber 16 and which is sensed via the pressure sensor 40. The sensor 40, in turn, induces the opening of the air control valve 38 so as to increase the supply of air injected into the bottom of the reservoir 16.

The pressurized air, in turn, causes the liquid fuel to be forced up and through the pores of the mesh screen 44 interior to the annular space of the float 32. This action causes the liquid fuel to be initially atomized as it enters the flow path to the combustion chamber. As the atomized fuel progresses in its journey to the combustion chamber, it is vaporized via the heated environment in which it finds itself. That is, the surrounding heated water or exhaust gases cause not only the liquid fuel to be heated, but also the atomized fuel as it rises to the air intake 14. The air introduced via the throttle plate 23 is finally mixed with the heated/atomized/vaporized fuel in the air intake 14 so as to further facilitate the vaporization process. Thus, the air/fuel mixture as it enters the combustion chamber is essentially vaporized so as to result in more efficient combustion.

Recognizing, too, that upon engine start up the liquid coolant of the engine 2 is not typically heated, it is oftentimes necessary to initially increase the air pressure so as to facilitate the vaporization process, until the liquid coolant temperature rises. Thus, a coolant temperature sensor 42 is mounted at the base of the heating cavity 10 so as to detect the temperature of the surrounding medium and thereby provide a further control signal to the air control valve 38. Specifically, upon start-up, the temperature sensor 42 signals the temperature and in response to which the air control valve 38 limits the pressure. As the coolant temperature changes, the pressure is varied and an exemplary range of which is set forth in Table 1 below, but which range and settings may be varied with engine size considerations, etc. Thus, as the circulant temperature rises to operating temperature (80° F. and above), the temperature sensor 42 signals the air control valve 38 for lower pressures.

TABLE 1

| Engine Temperature (°F.) | Pressure (psi) |
|---|---|
| less than 80 | 10 |
| 80–100 | 9 |
| 100–120 | 8 |
| 120–140 | 7 |
| 140–160 | 6 |
| 160–180 | 5 |
| 180–200 | 4 |
| 200–220 | 3 |

Therefore, fuel vaporization is maintained as a function of air pressure and circulant temperature and which coact via appropriate electrical circuitry to control the air control valve 38.

Figure 3:
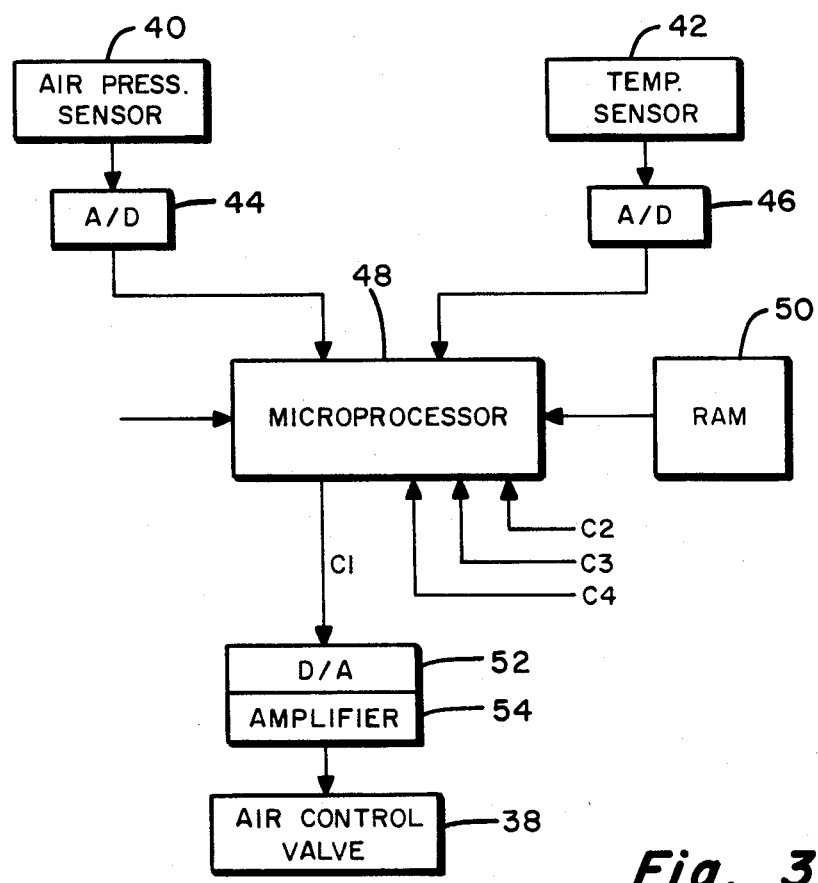
FIG. 3 shows a generalized block diagram of the circuitry for controlling the delivery of fuel relative to the sensed air pressure, circulant temperature and throttle demand.

In the later regard, attention is now directed to FIG. 3 and wherein a generalized block diagram is shown for such circuitry. Specifically, it is contemplated that such circuitry would include the air and temperature sensors 40 and 42 as well as respective analog-to-digital convertors 44 and 46 for converting the analog signals to a digital value that would be acted upon via an onboard microprocessor 48, according to a preprogrammed algorithm contained within RAM 50. The digital output, in turn, would be converted to an analog level via the digital to analog convertor 52 and be amplified via amplifier 54 before being impressed on the air control valve 38. While at present, a simple proportioning control is contemplated, it is to be recognized that via the microprocessor 48 and the implementation of other well known fuel ratioing technologies, the vaporization process can be optimized for each of the engine's cylinders. Further, the microprocessor 48 can act to sense the conditions of the other carburetors 4 associated with each of the other cylinders via its C2, C3 and C4 inputs. Coordination can thus be achieved for each of the cylinders. It should be noted, too, that it may be desirable in some instances to further incorporate a sensor with respect to the throttle valve 23 such that the air flow within each of the air intakes 14 can be sensed and factored into the control of the engine's fuel/air mixture. Thus, a number of modifications are contemplated for possibly improving the present apparatus.

While the present invention has been described with respect to its presently preferred embodiment, it is to be noted that numerous other embodiments and/or modifications may be made thereto without departing from the spirit and scope of the present specification and following claims. It is accordingly contemplated that the following claims shall be interpreted to include all such equivalent embodiments are as encompassed within the present invention.

What is claimed is:

1. An improved carburetor coupled to an internal combustion engine, comprising in combination:
   (a) a throttle controlled air intake;
   (b) a multi-chambered housing having at least a first and a second chamber, said second chamber mounted in heat transfer relation to said first chamber and said air intake and adapted to receive and exhaust a heated medium;
   (c) means for sensing the pressure within said first chamber and producing an associated control signal; and
   (d) fuel vaporization means coupled to a fuel supply and contained within said first chamber for controllably vaporizing said fuel and admitting the vaporized fuel to said air intake in response to varying engine demands, said fuel vaporization means including a multi-apertured member mounted in overlying relation to fuel admitted thereto and, including means coupled to a positive pressure air supply and to said pressure sensing means for applying positively pressurized air beneath the surface of the fuel so as to atomize the fuel by forcing it through said multi-apertured member and to vaporize the atomized fuel as it passes from the heated first chamber to the heated air intake and to said engine; and wherein said air admitting means is responsive to said control signal for controllably admitting the air at pressures dependent upon the sensed pressure and engine load conditions.

2. Apparatus as set forth in claim 1 wherein said fuel vaporization means includes a tapered needle valve mounted within an orifice overlying said multi-apertured member and wherein said needle valve is coupled to means responsive to engine demands, for controlling the rise and fall of said needle valve relative to said orifice and thereby the amount of vaporized fuel admitted to said air intake and said engine.

3. Apparatus as set forth in claim 1 wherein said multi-apertured member comprises a torus-shaped float having a finely meshed screen mounted across an annular opening thereof and through which said fuel passes as it is atomized, said torus-shaped float further being coupled to means for admitting fuel in a predetermined relation to the level of the float within said first chamber.

4. Apparatus as set forth in the above claim 3, including upper and lower stops mounted within said first chamber for vertically limiting the travel of said float and also including means for preventing the rotation of said float as it moves up and down.

5. Apparatus as set forth in claim 1 including means coupled to said air admitting means and to said second chamber for sensing the temperature of said heating medium as it passes through said second chamber and for preventing the operation of said air admitting means until a predetermined temperature is sensed.

6. Apparatus as set forth in claim 5 wherein said air admitting means includes a memory having a plurality of pre-programmed instructions and pressure related data stored therein relative to a plurality of ranges of temperature and processing means responsive to said instructions and said sensed pressure and temperature for controlling the pressure of the admitted air relative to the sensed pressure and temperature.

7. An improved carburetor for an internal combustion engine comprising in combination:
(a) an air intake;
(b) a multi-chambered housing having a first chamber coupled to a fuel supply and to said air intake, said first chamber including a float member having a finely meshed screen mounted across a portion thereof in overlying relation to said fuel, and a second chamber surrounding said first chamber and a substantial portion of said air intake;
(c) means for admitting fuel to said first chamber in relation to the level of said float in said first chamber;
(d) means for sensing pressure in said first chamber;
(e) means for controllably admitting positively pressurized air beneath said screen in relation to pressures sensed in said first chamber so as to atomize said fuel by forcing it through said screen;
(f) means for circulating a heated medium through said second chamber relative to the pressure within said first chamber; and
(g) variable jet means coupled to said air intake and to said first chamber for responsively admitting greater or lesser amounts of atomized fuel to said air intake in response to engine demands.

* * * * *